United States Patent [19]
Ohta et al.

[11] Patent Number: 5,443,904
[45] Date of Patent: Aug. 22, 1995

[54] HIGH-TENACITY POLYETHYLENE FIBER

[75] Inventors: Yasuo Ohta; Tadao Kuroki; Yoshinobu Oie, all of Otsu, Japan

[73] Assignee: Toyo Boseki Kabushiki Kaisha, Osaka, Japan

[21] Appl. No.: 355,910

[22] Filed: Dec. 14, 1994

[30] Foreign Application Priority Data

Dec. 16, 1993 [JP] Japan ................ 5-316954

[51] Int. Cl.$^6$ ............................ D02G 3/00
[52] U.S. Cl. .................... 428/364; 428/394
[58] Field of Search ............... 428/364, 394

[56] References Cited

U.S. PATENT DOCUMENTS 4,415,726 11/1983 Tanji et al. ................ 528/272
4,426,516 1/1984 Kuriki et al. ............... 528/272
5,179,171 1/1993 Minami et al. ............. 525/288

Primary Examiner—N. Edwards
Attorney, Agent, or Firm—Fish & Richardson

[57] ABSTRACT

There is disclosed a high-tenacity polyethylene fiber containing an ethylene component as a main repeating unit, the fiber exhibiting an intrinsic viscosity $[\eta_B]$ of at least 7 and having a tenacity of at least 30 g/d and an elastic modulus of at least 900 g/d; the peak value of loss tangent in the $\gamma$-dispersion being 0.025 to 0.06 and the peak temperature of loss modulus in the a-dispersion being 85° C. or higher, as determined by measurement of temperature dispersion of viscoelastic properties of the fiber. Also disclosed is a process of producing such a high-tenacity polyethylene fiber.

9 Claims, No Drawings

HIGH-TENACITY POLYETHYLENE FIBER

FIELD OF THE INVENTION

The present invention relates to a novel high-tenacity polyethylene fiber having excellent vibration-absorbing properties at low temperatures, very high impact resistance as compared with conventional polyethylene fibers, and quite excellent mechanical properties such as tenacity. The polyethylene fiber of the present invention can be utilized for various purposes such as reinforcing fibers for composite materials used at low temperatures, particularly extremely low temperatures of $-200°$ C. or lower, reinforcing fibers for helmets used in driving autocycles or automobiles, and antiballistic protective clothing or composite materials for giving proof against flying small objects, bullets and the like.

BACKGROUND OF THE INVENTION

In recent years, many attempts have been extensively made to obtain a high-tenacity and high-modulus fiber by use of an ultrahigh-molecular-weight polyethylene as a raw material, and some reports can be found on a polyethylene fiber having very high tenacity and very high elastic modulus. For example, the so-called "gel spinning method" is disclosed in Japanese Patent Laid-open Publication No. 15408/1981. In this method, an ultrahigh-molecular-weight polyethylene is dissolved in a solvent and extruded into a gel fiber which is then stretched at a high ratio.

It is well known that the high-tenacity polyethylene fiber obtained by the "gel spinning method" has very high tenacity, very high elastic modulus and quite excellent impact resistance for an organic fiber. For various purpose, its application has been partly spreading over some technical fields. With the object of producing such a high-tenacity fiber, the above publication further discloses a technique for providing a material having very high tenacity and very high elastic modulus.

The conventional technique is, however, disadvantageous in that an attempt to produce a high-tenacity fiber will contrarily cause deterioration of vibration-absorbing properties at low temperatures as described in detail blow. This disadvantage, therefore, makes it impossible to obtain a high-tenacity fiber having retained vibration-absorbing properties at low temperatures.

For various purposes of protective materials, they have recently been required to have higher impact resistance to meet the needs of their weight saving. Also for the conventional high-tenacity fibers, they have been required to have resistance to higher-speed impact, and there is a great demand for the appearance of an innovative material. There remains a discussion on the factor making a dominant contribution to high-speed impact-absorbing properties, and in the case of a polyethylene fiber which is a viscoelastic material from a theological point of view, it is predicted from the famous rule of time-temperature superposition that high-speed deformation will receive a great influence from the physical properties of the fiber at low temperatures. Accordingly, if a material having vibration-absorbing properties at low temperatures, more generally speaking, a material absorbing impact energy, can be obtained, such a material may also be used as a material having quite excellent high-speed impact-absorbing properties.

SUMMARY OF THE INVENTION

Under these circumstances, the present inventors have intensively studied and succeeded in developing a high-tenacity polyethylene fiber having quite excellent vibration-absorbing properties at low temperatures without any deterioration of mechanical properties at ordinary temperatures and consequently having quite excellent high-speed impact resistance, thereby completing the present invention.

Thus, the present invention provides a high-tenacity polyethylene fiber comprising an ethylene component as a main repeating unit, the fiber exhibiting an intrinsic viscosity $[\eta_B]$ of at least 7 and having a tenacity of at least 30 g/d and an elastic modulus of at least 900 g/d; the peak value of loss tangent in the $\gamma$-dispersion being 0.025 to 0.06 and the peak temperature of loss modulus in the $\alpha$-dispersion being 85° C. or higher, as determined by measurement of temperature dispersion of viscoelastic properties of the fiber.

The present invention further provides a process of producing a high-tenacity polyethylene fiber, comprising the steps of: mixing an ultrahigh-molecular-weight polyethylene exhibiting an intrinsic viscosity $[\eta_A]$ of at least 10 and a solvent with heating for dissolution, the weight ratio of the polyethylene to the solvent being in the range of 5:95 to 50:50; extruding the mixture and cooling the extrudate to form a semi-finished fiber; and stretching the semi-finished fiber at a ratio of at least 10 times to form a finished fiber exhibiting an intrinsic viscosity $[\eta_B]$ of at least 7 and having a tenacity of at least 30 g/d and an elastic modulus of at least 900 g/d, the intrinsic viscosities $[\eta_A]$ and $[\eta_B]$ complying with the following relationship:

$$0.7 \times [\eta_A] \leq [\eta_B] \leq 0.9 \times [\eta_A].$$

DETAILED DESCRIPTION OF THE INVENTION

The high-tenacity polyethylene fiber of the present invention can be obtained from an ultrahigh-molecular-weight polyethylene as a raw material. As used herein, the term "ultrahigh-molecular-weight polyethylene" refers to a polymer containing an ethylene component as a main repeating unit. The ultrahigh-molecular-weight polyethylene may be a homopolymer of ethylene or a copolymer with small amounts of other monomers, such as $\alpha$-olefins, acrylic acid or its derivatives, methacrylic acid or its derivatives, vinylsilane or its derivative, and the like. The ultrahigh-molecular-weight polyethylene may also be a polymer blend of these copolymers with one another or with a homopolymer of ethylene or other $\alpha$-olefins. In particular, the use of a copolymer of ethylene with a monomer capable of introducing a short branched chain, such as propylene and 1-butene, is recommended because the peak value of loss tangent in the $\gamma$-dispersion can be increased and the vibration-absorbing properties at low temperatures can therefore be improved. However, an excessive increase in the amount of other monomers than ethylene will become a factor of inhibiting the stretching. Accordingly, from the point of view that high-tenacity and high-modulus polyethylene fibers are to be obtained, the amount of other monomers than ethylene is preferably 5 mol % or less. As a matter of course, a homopolymer of ethylene may be used as the raw material.

An important feature of the present invention is in that quite excellent mechanical properties at ordinary temperatures, excellent vibration-absorbing properties at low temperatures, and very high resistance to high-speed impact can be attained, when the peak value of loss tangent in the γ-dispersion is 0.025 to 0.06, preferably 0.030 to 0.05, and more preferably 0.035 to 0.05, and the peak temperature of loss modulus in the α-dispersion is 85° C. or higher, preferably 90° C. or higher, and more preferably 95° C. or higher, as determined by measurement of temperature dispersion of dynamic viscoelasticity of the fiber.

In the polyethylene fiber of the present invention, the excellent vibration-absorbing properties at low temperatures are clearly distinguished by the fact that the peak temperature and peak value of loss tangent in the γ-dispersion are both very high. The high peak value of loss tangent in the γ-dispersion of the fiber means that the fiber deserves to have excellent power of absorbing vibration and impact at low temperatures. In the prior art, however, when mechanical properties at ordinary temperatures are allowed to remain unchanged, this peak value usually becomes decreased.

It should be very surprised that the polyethylene fiber of the present invention can exhibit a high peak value of loss tangent in the γ-dispersion while having excellent physical properties at ordinary temperatures. The high peak temperature of loss tangent in the γ-dispersion of the fiber is suggestive. It has hitherto been known that γ-dispersion may receive a contribution both from amorphous pans and from crystalline parts. From the peak observed at relatively high temperatures for the polyethylene fiber of the present invention, it may be suggested that a dominant structure exhibiting the γ-dispersion is composed mainly of crystalline parts rather than amorphous parts. In other words, it suggests that the polyethylene fiber of the present invention has a different fiber structure from that of conventional polyethylene fibers. Further, the peak temperature of loss modulus in the α-dispersion of the fiber is observed at very high temperatures. The peak temperature of loss modulus in the α-dispersion is 85° C. or higher, preferably 90° C. or higher, and more preferably 95° C. or higher. To the knowledge of the present inventors, there have been no reports on a polyethylene exhibiting α-dispersion at such high temperatures. Usually, such a substance, if present, has very high crystallinity and it therefore exhibits a very low peak value (e.g., less than 0.015) of loss tangent in the γ-dispersion. As repeatedly emphasized, it is believed that the high peak temperature and high peak value of loss tangent in the γ-dispersion correspond to excellent vibrating-absorbing properties at low temperatures and excellent resistance to high-speed impact, and the high peak temperature of loss modulus in the α-dispersion means excellent physical properties such as tenacity at room temperature and excellent resistance to deformation at high temperatures. In this case, mechanical properties (particularly, elastic modulus) at ordinary temperatures have a great influence on the resistance to high-speed impact, and it is therefore presumed that both produce a synergistic effect such that the polyethylene fiber of the present invention can attain a notable improvement both in the vibration-absorbing properties at low temperatures and in the resistance to high-speed impact at ordinary temperatures.

A process of producing the polyethylene fiber of the present invention inevitably requires novel and prudent procedures; it is, however, not particularly limited to the following example.

As the process of producing the polyethylene fiber of the present invention, the above-described "gel spinning method" is effective as a practical method; however, the basic spinning technique is not particularly limited, so long as the process is intended for obtaining conventional high-tenacity polyethylene fibers by extrusion of an ultrahigh-molecular-weight polyethylene. For this purpose, it is important to control the relationship between the molecular weight of a polymer used and the molecular weight of a fiber obtained. If the intrinsic viscosities of a polymer used and of a stretched fiber obtained are represented by the symbols $[\eta_A]$ and $[\eta_B]$, respectively, quite excellent physical properties at ordinary temperatures and quite excellent vibration-absorbing properties at low temperatures are expected only when the intrinsic viscosities $[\eta_A]$ and $[\eta_B]$ comply with the following relationship:

$$0.7 \times [\eta_A] \leq [\eta_B] \leq 0.9 \times [\eta_A],$$

preferably with the following relationship:

$$0.75 \times [\eta_A] \leq [\eta_B] \leq 0.85 \times [\eta_A].$$

In these relationships, the intrinsic viscosity $[\eta_A]$ is at least 10, preferably at least 15, and more preferably at least 18.5, and the intrinsic viscosity $[\eta_B]$ is at least 7, preferably at least 11, and more preferably at least 13.

In the prior art, the degree of deterioration has not been discussed for the resulting fiber, and if referred thereto, it was aiming at the purpose of how to reduce the degree of deterioration. This is because if the deterioration of a polymer occurs in the spinning step, the tenacity of the resulting fiber becomes decreased, which is believed to be not preferred from the point of view that it is an object to attain excellent physical properties. In the actual step of spinning, various kinds of antioxidants are usually used to prevent the polymer deterioration. Accordingly, it is a novel and unexpected fact that intentional acceleration of polymer deterioration to an appropriate extent can make an improvement both in the workability and stretchability of the polymer and in the vibration and impact-absorbing properties at low temperatures.

It is presumed that accelerating the degree of deterioration leads to a narrow distribution of molecular weights by substantial removal of high-molecular-weight components in the molecular weight distribution of a polyethylene with a broad molecular weight distribution.

In the present invention, the lower limit of intrinsic viscosity of the fiber is provided because an excessive increase in the degree of deterioration causes a notable decrease in the average molecular weight and consequently a decrease in the tenacity. In some cases, the occurrence of a cross-linking reaction by a radical formed by molecular breaking may lead to a notable decrease in the stretchability of the polymer. Accordingly, the intrinsic viscosity $[\eta_B]$ of the resulting fiber is important, and as described above, it should be at least 7, preferably at least 11, and more preferably at least 13.

As a means of accelerating the degree of deterioration in the present invention, there can be mentioned various techniques, for example, thermal or mechanical shearing, oxidation, application of energy such as ultraviolet rays, or addition of a deterioration-accelerating agent such as a peroxide. Basically, the degree of deterioration is important, but its establishment does not depend upon the selection of a technique. A standard technique should not involve the use of an antioxidant, which is recommended, and the choice of conditions to be employed in the dissolving step becomes very important.

The solvent to be used for dissolving the ultrahigh-molecular-weight polyethylene is not particularly limited, and typical examples of the solvent include aliphatic and alicyclic hydrocarbons, such as octane, nonane, decane and paraffin, including various isomers of these hydrocarbons; petroleum fractions; aromatic hydrocarbons such as toluene and naphthalene, and hydrogenated derivatives of these hydrocarbons, such as decalin (decahydronaphthalene) and tetralin (tetrahydronaphthalene); and halogenated hydrocarbons. The weight ratio of the ultrahigh-molecular-weight polyethylene to the solvent is 5:95 to 50:50. In other words, the amount of ultrahigh-molecular-weight polyethylene to be used is 5 to 50 parts by weight, while the amount of solvent to be used is 95 to 50 parts by weight.

Further, it is effective to conduct pre-stretching at low temperatures between the spinning step and the ordinary stretching step, as described in Examples below. For example, the pre-stretching step may be conveniently performed by using two pairs of Nelson rollers having different rotation speeds, although it is not limited thereto. The temperature for the pre-stretching is preferably set at the peak temperature of loss modulus in the α-dispersion or lower. No definite reason has been found why such pre-stretching is effective, but it is presumed that orientation by the pre-stretching before the stretching provides an appropriate relaxation in the molecular chain which has been under tension till that time by the interlocking of high-molecular-weight components and the growth of crystals with a little disorder can therefore be attained in the subsequent crystallization step, resulting in a polyethylene fiber having a characteristic crystal structure as indicated in the above α- and γ-dispersions.

The pre-stretching, if employed, may be conducted at a ratio of 1.05 to 2.0 times at a temperature of 130° C. or lower, preferably 1200C. to room temperature.

Finally, the stretching is conducted at a time or successively at two or more separated stages. In any case, the total stretch ratio (if the stretching is divided into two stages, the total stretch ratio is calculated as the first-stage stretch ratio x the second-stage stretch ratio) is at least 10 times.

For the polyethylene fiber thus obtained, the tenacity is at least 30 g/d, preferably at least 35 g/d, and more preferably at least 38 g/d, and the elastic modulus is at least 900 g/d, preferably at least 1100 g/d, and more preferably at least 1200 g/d.

The following will describe the method and conditions of measurement for determining the characteristic values as described herein.

(Tenacity and elastic modulus)

The tenacity and elastic modulus as used herein were determined by obtaining a stress-strain curve at an atmospheric temperature of 20° C. and a relative humidity of 65% using "TENSILON" (ORIENTEC) under the conditions that the sample length was 200 mm and the elongation speed was 100%/min, and then calculating the tenacity (g/d) as the stress at the breaking point in the curve and the elastic modulus (g/d) from the tangent line giving the maximum slope of the curve near the origin. Each value was expressed as an average of ten measured values.

(Intrinsic viscosity)

The intrinsic viscosity as used herein was determined by measuring the specific viscosities of various dilute solutions in decalin at 135° C. by means of an Ubbelode capillary tube viscometer, and reading the extrapolated point toward the origin of a straight line obtained by least-squares approximation of a plot of the measured viscosities against the respective concentrations. In the measurement, sample solutions were prepared by dissolving the raw material polymer in decalin at 135° C. with stirring for 4 hours after the addition of 1 wt % 2,6-di-t-butyl-p-cresol as an antioxidant to the polymer, wherein if the polymer was in powder form, it was used as such or wherein if the polymer was available as a bulk or thread-like sample, the sample polymer was divided or cut into a length of about 5 mm before use.

(Dynamic viscoelasticity test)

The measurement of dynamic viscoelasticity was conducted by means of an apparatus, RHEOVIBRON model DDV-01FP (ORIENTEC). The fibers were doubled or divided to have a fineness of around 100 deniers in total. Taking care that the respective single fibers were oriented as uniformly as possible, both ends of the fibers were attached to aluminum foil on one side of a base film with a cellulose adhesive so that the sample length became 20 mm, and a specimen was cut out so as to have the ends which were served as holding parts each having a length of about 5 min. Each specimen was given pre-vibration with an oscillation frequency of 110 Hz at a temperature of 60° C. for several seconds to stabilize the holding state before the actual measurement. In the measurement, temperature dispersion was determined at a frequency of 110 Hz from the low temperature side with increasing the temperature at a rate of about 1 ° C./min within the limits of −150° C. to 150° C. At this time, the initial static load was 5 gf, and the sample length was automatically controlled so that the static load was kept constant; and the dynamic strain range was ±16 μm.

The present invention will be further illustrated by the following examples, which are not to be construed to limit the scope thereof.

EXAMPLE 1

Fifteen parts by weight of an ultrahigh-molecular-weight polyethylene having 0.8 methyl branched chains per 1000 carbon atoms in the main chain and exhibiting an intrinsic viscosity [$\eta_A$] of 18.5 were mixed with 85 parts by weight of decahydronaphthalene to form a slurry liquid, which was then fed to a screw extruder (30 mmφ). At this time, no antioxidant was used. The extrusion conditions in the screw extruder were controlled so that a high-tenacity polyethylene fiber exhibiting an intrinsic viscosity [$\eta_B$] of 14.7 was obtained. Each of the mixtures extruded under various conditions was subsequently extruded through a spinning nozzle having 30 orifices of 0.8 mmφ at 180° C. to form a gel fiber consisting of 30 filaments. The extruded gel fiber was cooled by an air stream, after which it was drawn by hot rollers rotating at a speed of 60 m/min at 85° C. and then fed to adjacent Nelson rollers rotating at a speed of 72 m/min (pre-stretching). Thus, the pre-stretching was conducted at a ratio of 1.2 times. The gel fiber was further stretched in an air-heated oven at 120° C. (first-stage stretching), and wound up at a speed of 260 m/min.

The partially-stretched fiber was further stretched at a speed of 300 m/min in an air-heated oven at 145° C. (second-stage stretching) to form various polyethylene fibers with increasing the stretch ratio to the upper limit at which breaking did not yet occur. Table 1 shows the ultimate stretch ratio (i.e., first-stage stretch ratio x second-stage stretch ratio) at which stretching was stably conducted in this experiment, and various physical properties (i.e., intrinsic viscosity [$\eta_B$], tenacity, elastic modulus, peak temperature and peak value of loss tangent (tan δ) in the γ-dispersion, and peak temperature of loss modulus (E″) in the α-dispersion) of the fiber obtained at the ultimate stretch ratio.

EXAMPLE 2

A polyethylene fiber was produced in the same manner as described in Example 1, except that the pre-stretching was omitted and the first-stage stretching was conducted at a speed of 60 m/min. The ultimate stretch ratio (i.e., first-stage stretch ratio x second-stage stretch ratio) at which stretching was stably conducted in this experiment, and various physical properties (i.e., intrinsic viscosity [$\eta_B$], tenacity, elastic modulus, peak temperature and peak value of loss tangent (tan δ) in the γ-dispersion, and peak temperature of loss modulus (E″) in the α-dispersion) of the fiber obtained at this ultimate stretch ratio are also shown in Table 1. As can be seen from Table 1, the physical properties of the polyethylene fiber obtained were quite excellent, but the peak value of loss tangent in the γ-dispersion, although still high, was slightly decreased as compared with the case of Example 1.

EXAMPLE 3

A polyethylene fiber was prepared in the same manner as described in Example 2, except that an ultrahigh-molecular-weight polyethylene having 6.1 methyl branched chains per 1000 carbon atoms in the main chain and exhibiting an intrinsic viscosity [$\eta_A$] of 17.0 was used. The physical properties of the fiber are also shown in Table 1, together with the ultimate stretch ratio. As can be seen from Table 1, the peak value of loss tangent in the γ-dispersion became greater than those of Examples 1 and 2.

EXAMPLE 4

A polyethylene fiber was prepared in the same manner as described in Example 2, except that an ultrahigh-molecular-weight polyethylene having 0.5 methyl branched chains per 1000 carbon atoms in the main chain and exhibiting an intrinsic viscosity [$\eta_A$] of 18.1 was used. The physical properties of the fiber are also shown in Table 1, together with the ultimate stretch ratio. As can be seen from Table 1, the peak value of loss tangent in the γ-dispersion, nearly equal to that of Example 3, was attained, and the peak temperature of loss modulus in the α-dispersion shifted to the high temperature side. This fact means that a high-tenacity polyethylene fiber having more favorable physical properties was obtained.

COMPARATIVE EXAMPLE 1

A polyethylene fiber was prepared in the same manner as described in Example 1, except that 1 wt % 2,6-di-t-butyl-p-cresol was added as an antioxidant to a mixture of the ultrahigh-molecular-weight polyethylene and the decahydronaphthalene.

The ultimate stretch ratio (i.e., first-stage stretch ratio x second-stage stretch ratio) at which stretching was stably conducted in this comparative experiment, and various physical properties (i.e., intrinsic viscosity [$\eta_B$], tenacity, elastic modulus, peak temperature and peak value of loss tangent (tan δ) in the γ-dispersion, and peak temperature of loss modulus (E″) in the α-dispersion) of the fiber obtained at the ultimate stretch ratio are also shown in Table 1. As can be seen from Table 1, the physical properties of the fiber obtained were inferior to those of Example 1, and the value of dynamic viscoelasticity, particularly the peak temperature of loss modulus in the α-dispersion, did not come to the desired value in the present invention.

COMPARATIVE EXAMPLE 2

A polyethylene fiber was prepared in the same manner as described in Example 1, except that an ultrahigh-molecular-weight polyethylene having 1.0 methyl branched chain per 1000 carbon atoms in the main chain and exhibiting an intrinsic viscosity [$\eta_A$] of 16.0 was used and 1 wt % 2,6-di-t-butyl-p-cresol was added as an antioxidant to a mixture of the ultrahigh-molecular-weight polyethylene and the decahydronaphthalene. The physical properties of the fiber are also shown in Table 1, together with the ultimate stretch ratio. As can be seen from Table 1, the semi-finished fiber of this comparative experiment had very poor stretchability and thus the finished fiber exhibited very poor physical properties. The peak value of loss tangent in the γ-dispersion was small, so that the vibration-absorbing properties at low temperatures were deteriorated and the peak temperature of loss modulus in the α-dispersion was also low; therefore, only a polyethylene fiber having poor heat resistance was obtained. This seems to be because the degree of fiber deterioration was less sufficient as compared with the case of Comparative Example 1.

COMPARATIVE EXAMPLE 3

A polyethylene fiber was prepared in the same manner as described in Example 1, except that an ultrahigh-molecular-weight polyethylene having 1.0 methyl branched chain per 1000 carbon atoms in the main chain and exhibiting an intrinsic viscosity [$\eta_A$] of 13.0 was used and 1 wt % 2,6-di-t-butyl-p-cresol was added as an antioxidant to a mixture of the ultrahigh-molecular-weight polyethylene and the decahydronaphthalene. The physical properties of the fiber are also shown in Table 1, together with the ultimate stretch ratio. As can be seen from Table 1, the peak value of loss tangent in the γ-dispersion became increased, while the intrinsic viscosity [$\eta_B$] was too much decreased and the tenacity was also very small. Consequently, the peak temperature of loss modulus in the a-dispersion was also low; therefore, only a polyethylene fiber having poor heat resistance was obtained.

COMPARATIVE EXAMPLE 4

Thirty parts by weight of an ultrahigh-molecular-weight polyethylene having 0.7 methyl branched chains per 1000 carbon atoms in the main chain and exhibiting an intrinsic viscosity [$\eta_A$] of 10.0 was mixed with 70 parts by weight of solid paraffin having a melting point of 85° C. and 1 wt % 2,6-di-t-butyl-p-cresol as an antioxidant. The mixture was well kneaded in a screw type mixer at 210° C. for dissolution, followed by spinning under the same conditions as described in Example 1, which afforded an unfinished fiber. At this time, the most appropriate drawing speed at the spinning was 20 m/min. The resulting unfinished fiber was allowed to pass in a decalin solution at 80° C., and then stretched in a heating oven under nitrogen atmosphere. The stretching was favorably conducted and there was obtained a polyethylene fiber having excellent tenacity and excellent elastic modulus; however, the peak value of loss tangent in the γ-dispersion was decreased smaller than those of Examples 1–4 and the peak temperature of loss modulus in the α-dispersion was slightly decreased as compared with the case of Example 1.

TABLE 1

| Experiment | Stretch ratio (—) | Intrinsic viscosity [$\eta_A$] (—) | Intrnsic viscosity [$\eta_B$] (—) | Tenacity (g/d) | Elastic modulus (g/d) | γ-Dispersion tan δ peak temperature (°C.) | γ-Dispersion tan δ peak value (—) | α-Dispersion E" peak temperature (°C.) |
|---|---|---|---|---|---|---|---|---|
| Example 1 | 30 | 18.5 | 14.7 | 44 | 1490 | −105 | 0.039 | 96 |
| Example 2 | 30 | 18.5 | 14.7 | 42 | 1360 | −110 | 0.026 | 89 |
| Example 3 | 22 | 17.0 | 12.5 | 37 | 1005 | −110 | 0.041 | 86 |
| Example 4 | 30 | 18.1 | 13.9 | 41 | 1110 | −107 | 0.042 | 93 |
| Comparative Example 1 | 11 | 18.5 | 17.0 | 24 | 843 | −115 | 0.035 | 81 |
| Comparative Example 2 | 9 | 16.0 | 15.0 | 20 | 502 | −105 | 0.022 | 81 |
| Comparative Example 3 | 24 | 13.0 | 4.5 | 21 | 411 | −104 | 0.047 | 80 |
| Comparative Example 4 | 30 | 10.0 | 9.2 | 34 | 1033 | −117 | 0.023 | 93 |

What is claimed is:

1. A high-tenacity polyethylene fiber comprising an ethylene component as a main repeating unit, the fiber exhibiting an intrinsic viscosity [$\eta_B$] of at least 7 and having a tenacity of at least 30 g/d and an elastic modulus of at least 900 g/d; the peak value of loss tangent in the γ-dispersion being 0.025 to 0.06 and the peak temperature of loss modulus in the α-dispersion being 85° C. or higher, as determined by measurement of temperature dispersion of viscoelastic properties of the fiber.

2. A polyethylene fiber according to claim 1, wherein the intrinsic viscosity [$\eta_B$] of the fiber is at least 11.

3. A polyethylene fiber according to claim 2, wherein the intrinsic viscosity [$\eta_B$] of the fiber is at least 13.

4. A polyethylene fiber according to claim I, wherein the tenacity of the fiber is at least 38 g/d.

5. A polyethylene fiber according to claim 1, wherein the elastic modulus of the fiber is at least 1200 g/d.

6. A polyethylene fiber according to claim 1, wherein the peak value of loss tangent in the γ-dispersion is 0.030 to 0.05.

7. A polyethylene fiber according to claim 6, wherein the peak value of loss tangent in the γ-dispersion is 0.035 to 0.05.

8. A polyethylene fiber according to claim 1, wherein the peak temperature of loss modulus in the α-dispersion is 90° C. or higher.

9. A polyethylene fiber according to claim 8, wherein the peak temperature of loss modulus in the α-dispersion is 95° C. or higher.

* * * * *